No. 666,920. Patented Jan. 29, 1901.
M. S. CLAWSON.
AUTOMATIC CUT-OUT DEVICE FOR USE IN CONNECTION WITH
ELECTRICAL GENERATORS.
(Application filed May 21, 1900.)
(No Model.)
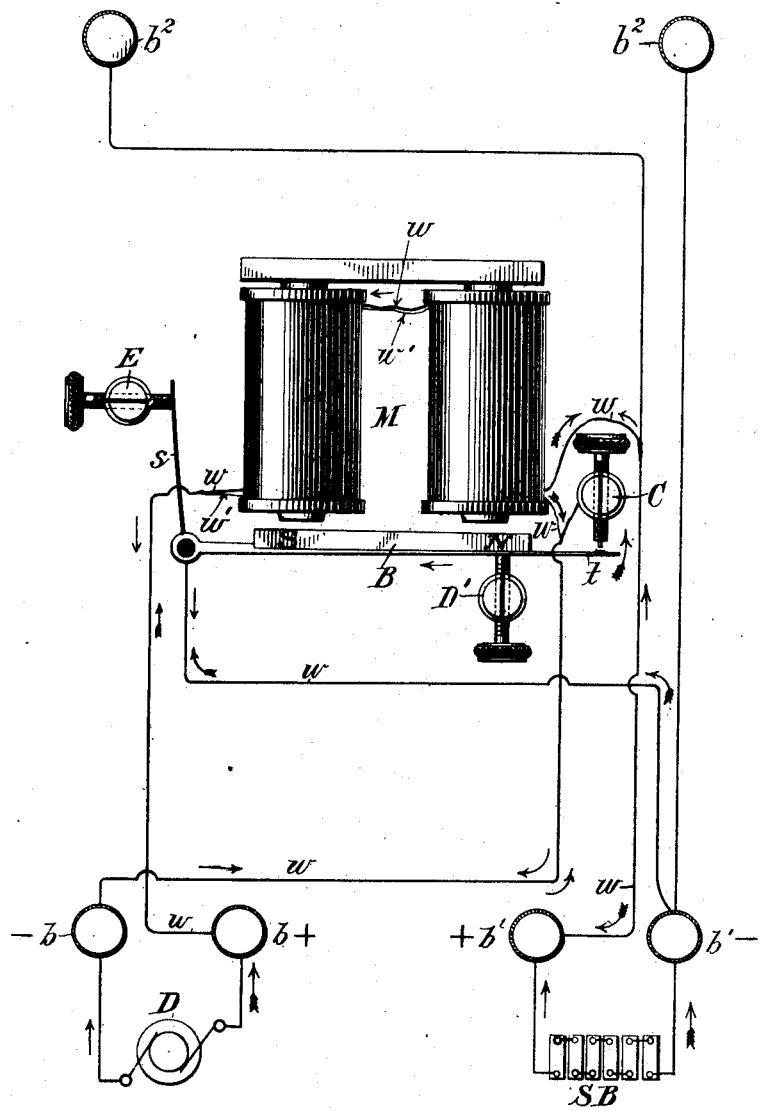
Witnesses:
Edward E Rowland
M. F. Keating
Inventor
Monroe S Clawson
By his Attorney
Charles J. Kintner

UNITED STATES PATENT OFFICE.

MONROE S. CLAWSON, OF WEEHAWKEN, NEW JERSEY.

AUTOMATIC CUT-OUT DEVICE FOR USE IN CONNECTION WITH ELECTRICAL GENERATORS.

SPECIFICATION forming part of Letters Patent No. 666,920, dated January 29, 1901.

Application filed May 21, 1900. Serial No. 17,356. (No model.)

*To all whom it may concern:*

Be it known that I, MONROE S. CLAWSON, a citizen of the United States, residing at Weehawken, State of New Jersey, have made a new and useful invention in Automatic Cut-Out Devices for Use in Connection with Electrical Generators, of which the following is a specification.

My invention is directed particularly to an automatic cut-out device designed for use in connection with the charging of storage batteries; and it has for its object the prevention of the short-circuiting of the battery through the generator when the voltage of the latter drops below that of the former.

My invention has an especial utility when applied to the charging of storage batteries in connection with the ignition of gas in the explosion-chamber of a gas or other explosive engine, although it may be used in any place where the result sought is attained.

The accompanying drawing is a diagrammatic view illustrating the invention as used in connection with the charging of a storage battery by a dynamo-electric machine, circuit connections being also shown running from the storage battery to a source of current usage.

My invention contemplates generically the use of an automatic cut-out device which is so arranged that so long as the electromotive force of the generator overpowers that of the storage battery being charged the cut-out device will maintain the circuit connections between the generator and the battery intact, and when for any reason whatever the voltage of the generator falls below that of the battery there will be a momentary counter-flow of current from the battery through the cut-out device and the generator in such manner that it (the generator) will be instantly automatically disconnected and without any injurious effects thereto, the arrangement being such that the instant the electromotive force of the generator again exceeds that of the battery the latter will be automatically connected to the former and the charging thereof continued as before.

Referring now to the drawing in detail for a full and clear understanding of the invention, such as will enable others skilled in the art to use the same, D represents a dynamo-electric generator having its commutator-brushes connected, respectively, to + and − binding-posts $b\ b$, and SB a storage battery designed to be charged thereby and having its + and − poles connected, respectively, to binding-posts $b'\ b'$. The binding-posts $b'\ b'$ are also connected by conductors running to a third pair of binding-posts $b^2\ b^2$, which are designed to be connected to the sparking device of a gas-engine or to any system to be supplied with electricity by the storage battery SB.

M represents the magnet of the automatic cut-out device, said magnet being of usual form and wound in the same direction with two coils of insulated wire, one of the windings being of coarse and the other of fine wire.

$w$ represents a conductor running from the + binding-post $b$ to the united windings of the magnet M and ultimately connected with the + binding-post $b'$ of the storage battery SB, the − binding-post $b'$ being connected by a similar conductor to the pivot-point of the armature-lever $t$, to which is secured on its upper surface a permanent magnet B, having its opposite poles N and S located in close proximity to the free soft-iron poles of the electromagnet M.

$D'$ is an adjustable back stop of usual form, and E is a similar adjustable stop adapted to act upon the free end of a retractile spring $s$, secured to the pivoted end of the armature-lever $t$.

C is an adjustable front contact-stop connected to the conductor $w$.

It will be noted that the high-resistance winding $w'$ is connected permanently in circuit with the + and − binding-posts $b\ b$ of the dynamo-electric machine D and constitutes, therefore, a high-resistance shunt, the function of which is to give to the poles of the magnet M the desired polarity to attract the permanent magnet-armature B when the generator establishes in the shunt the desired voltage.

The operation of the apparatus is as follows: Normally the circuit connection between the dynamo D and storage battery SB is interrupted between the free or outer end of the armature-lever $t$ and the adjustable front contact C. When the dynamo D is set in motion, however, and reaches the desired speed, current is established through the conductor $w$ in the direction of the tailed arrows, the high-resistance shunt $w'$, magnet M, and return-conductor $w$ to the — binding-post $b$, and when it reaches the desired voltage the armature-lever $t$ is drawn up, with the opposite poles N and S of the armature B in close proximity to the free poles of the magnet M. A branch circuit is now established from the positive pole of the dynamo D through the low-resistance coil of the magnet M, as indicated by the tailed arrows, passing out of the magnet to the + binding-post $b'$ of the storage battery SB, thence to the — binding-post $b'$, thence by the conductor $w$ to the pivot-point of the armature-lever $t$, and thence by the adjustable front contact C, conductor $w$, to the — binding-post $b$, the current through both of the coils of the automatic cut-out acting in the same direction upon the cores of the magnet and tending to hold the armature B in its upper position, so as to maintain the circuit closed through the storage battery. During this condition of affairs any current may be utilized from the storage battery at the binding-posts $b^2$ $b^2$ as desired. Should the voltage in the dynamo drop below a definite or determined point, the retractile spring $s$ tends to withdraw the armature B from the poles of the magnet M, and when the condition of affairs is such that the voltage of the storage battery closely approximates that of the dynamo a counter-current is set up through the low-resistance coil of the magnet M in the direction of the tailless arrows from the + binding-post $b'$ of the storage battery to the + binding-post $b$ of the dynamo, through the latter, the — binding-post $b$, by conductor $w$ to the adjustable front contact-stop C, armature-lever $t$, and conductor $w$ to the — binding-post $b'$ of the battery. Consequently this flow of current acting in a reverse direction to that of the generator passing through the high-resistance shunt $w'$ causes the poles of the magnet to assume a reverse or repellent polarity, so that the armature B is repelled and the circuit instantly broken between the free end of the armature-lever $t$ and the adjustable front contact-stop C. As soon as the dynamo again assumes sufficient speed to establish the proper potential in the high-resistance shunt-circuit $w'$ the circuit connections are automatically effected between the armature-lever $t$, adjustable front contact C, and the storage battery, and charging is resumed.

Such an automatic cut-out device as thus arranged has an established utility in connection with gas or other explosive engines used in connection with automobiles, where it is desirable to have a practically-constant source of electrical energy available, the arrangement being such that when the automobile is in motion at a definite speed the dynamo D driven thereby will establish an electromotive force through the automatic cut-out device sufficient to keep the battery in circuit connection therewith and always charged to the proper capacity, a diminution of electromotive force in the generator, due to slowing down of the vehicle or from any other cause whatever, making it apparent that the automatic cut-out device will immediately sever the circuit connections between the dynamo and the battery, and thus leave the latter on open circuit.

Although I have designed the above-described invention especially for use in connection with such appliances, I do not limit myself to such use, as it is obvious that it has utility in connection with the charging of storage batteries in general or in connection with any two types of electrical generators where relative changes in potential and current of the two generators might produce harmful results were not some means provided for disconnecting or severing the circuit between them.

I believe it is broadly new with me to utilize an automatic electromagnetic cut-out device between a storage battery and its charging-generator in which the armature or movable part of the cut-out device is provided with a permanent magnet, the circuit connections of the storage battery to the coils of the electromagnetic cut-out device and the charging-generator being located in the main circuit only of said generator, and my claims are generic as to this feature.

Having thus described my invention, what I claim, and desire to secure by Letters Patent of the United States, is—

1. An automatic cut-out device for regulating the current-flow between a charging and a receiving source of current-supply, as a storage battery, consisting of an electromagnet having two coils, said coils being connected directly in the main circuit only of said charging-generator and in such manner that a decrease in the voltage of the charging-current establishes a countermotive effect from the receiving source which causes the latter to be disconnected from the former.

2. An automatic device for regulating the current-flow between a charging and a receiving source of current-supply, consisting of electromagnetic means embracing a double coil, the windings of said double coil being connected in the main circuit only of the charging source of current-supply; together with an armature having contacts for making and breaking the circuit between said sources of current-supply.

3. Means for regulating the current-flow between a generator of electricty and a storage battery, consisting of an electromagnet provided with two sets of windings, one of relatively high and the other of relatively low resistance, and circuit connections between said windings, the main circuit only of generator, and the battery, whereby a predetermined drop of current potential in the generator permits a flow of current from the battery through the low-resistance coil in such manner as to effect an interruption of the circuit between the generator and the battery.

4. A device for automatically connecting and disconnecting two sources of current-supply, consisting of an electromagnet provided with circuit connections to both sets of supply and a circuit-interrupting armature-lever carrying a permanent magnet as an armature for the magnet, the circuit connections being through the main circuit only of the generator and such that under normal conditions the armature is attracted by the magnet, but for abnormal conditions it is repelled.

5. A circuit-controlling device for regulating the flow of current between a dynamo-electric machine and a storage battery, consisting of an electromagnet having two sets of windings, one of which is permanently in circuit with the main circuit only of the dynamo, and the other provided with circuit connections to both the dynamo and the battery; in combination with an armature-lever provided with circuit-contacts and carrying a permanent magnet for an armature, the arrangement of the circuits and circuit connections being such that for a normal or predetermined voltage of the dynamo the armature-lever is held against its circuit-making contact and the battery is charged, and for an abnormal drop in the voltage a backflow of current passes through one of the coils and the armature is repelled, the circuit between the dynamo and the battery being interrupted.

6. A circuit-controlling device for regulating the flow of current between a dynamo-electric machine and a storage battery, consisting of a horseshoe electromagnet having two sets of windings, one of which is permanently in circuit with the main circuit only of the dynamo and the other provided with circuit connections to both the dynamo and the battery; in combination with an armature-lever provided with circuit-contacts and carrying a permanent magnet for an armature, the arrangement of the circuits and circuit connections being such that for a normal or predetermined voltage of the dynamo the armature is held against its circuit-making contact and the battery is charged, and for an abnormal drop in the voltage a backflow of current passes through one of the coils and the armature is repelled, the circuit between the dynamo and the battery being interrupted, substantially as described.

In testimony whereof I have hereunto subscribed my name this 20th day of April, 1900.

MONROE S. CLAWSON.

Witnesses:
   C. J. KINTNER,
   M. F. KEATING.